United States Patent [19]

Dulberg et al.

[11] Patent Number: 4,992,395

[45] Date of Patent: Feb. 12, 1991

[54] MOLTEN ALUMINUM RESISTANT REFRACTORY COMPOSITION CONTAINING CERAMIC FIBERS

[75] Inventors: Jed L. Dulberg; John K. Steelman; Timothy K. Myers, all of Burlington, N.C.

[73] Assignee: Aluminum Company of America, Pittsburgh, Pa.

[21] Appl. No.: 344,689

[22] Filed: Apr. 28, 1989

[51] Int. Cl.$^5$ ............... C04B 35/80; C04B 35/10; C04B 28/24
[52] U.S. Cl. ............... 501/95; 501/133; 501/154; 106/38.27; 106/38.3; 106/38.9; 106/699; 106/700; 106/711; 106/802; 106/805; 106/808; 106/816; 264/30
[58] Field of Search ............... 264/30; 501/138, 95; 106/38.22, 85

[56] References Cited

U.S. PATENT DOCUMENTS

| | | | |
|---|---|---|---|
| 2,516,892 | 8/1950 | Lobaugh | 106/64 |
| 4,060,424 | 11/1977 | Hofmann | 106/55 |
| 4,088,502 | 5/1978 | La Bar | 106/64 |
| 4,126,474 | 11/1978 | Talley et al. | 106/85 |
| 4,174,331 | 11/1979 | Myles | 501/95 |
| 4,622,070 | 11/1986 | Sakurai et al. | 106/38.22 |

Primary Examiner—Mark L. Bell
Assistant Examiner—Melissa Bonner
Attorney, Agent, or Firm—Andrew Alexander

[57] ABSTRACT

A ceramic fiber containing refractory moldable composition suitable for use with molten aluminum alloys, the composition comprised of 10-18 wt. % ceramic fiber, 33-45 wt. % colloidal silica, 30-42 wt. % total content of liquid carrier, 0.2-2.5 wt. % organic polymer and 1-15 wt. % barium sulfate. The composition has a high level of resistance to attack or penetration by molten aluminum.

22 Claims, No Drawings

MOLTEN ALUMINUM RESISTANT REFRACTORY COMPOSITION CONTAINING CERAMIC FIBERS

BACKGROUND OF THE INVENTION

This invention relates to refractory compositions, and more particularly, it relates to moldable refractory compositions containing ceramic fibers having high resistance to molten aluminum alloys.

There are many commercially available refractory products or compositions which are designed for use with molten aluminum applications. These products include dense refractory brick, castables and plastic ramming mixes. Also available are light-weight insulating castables. These products contain additives which reduce reactions between the refractories and molten aluminum alloys. For example, LaBar U.S. Pat. No. 4,088,502 discloses a corrosion resistant castable refractory comprised of calcium aluminate, zinc borosilicate frit and fused silica. Lobaugh U.S. Pat. No. 2,516,892 discloses a refractory concrete which uses calcium aluminate cement, a refractory aggregate and an insoluble frit. Hofmann U.S. Pat. No. 4,060,424 discloses a ramming or gunning cement using boric acid and a low temperature softening glass or frit. Talley et al U.S. Pat. No. 4,126,474 discloses a phosphate-bonded alumina or alumino-silicate refractory for lining aluminum-melting furnaces and other containers for molten aluminum including 0.5 to 30 wt.% $BaSO_4$. U.S. Pat. No. 4,174,331 discloses a refractory moldable composition which, upon drying, sets up to refractory shapes which are strongly adherent to the molding surfaces and are essentially crack-free, contains about 45 to about 65% of a liquid vehicle, such as water; about 21 to about 26% ceramic fiber; about 7 to about 30% finely divided silica; and sufficient adhesion enhancing agent to impart from about 18 to about 50 grams per square centimeter adherence to steel.

Yet in spite of these disclosures there is still a great need for a refractory composition having improved properties and which has a high level of resistance to molten aluminum.

SUMMARY OF THE INVENTION

It is an object of this invention to provide an improved moldable refractory composition.

It is another object of this invention to provide a moldable refractory composition for use in containers for molten aluminum such as used in melting operations.

It is yet another object of this invention to provide an improved moldable refractory composition having improved resistance to molten metal attack or penetration.

These and other objects of this invention will be obvious from the description and claims.

In accordance with these objects, there is provided a ceramic fiber containing refractory moldable composition suitable for use with molten aluminum alloys, the composition comprised of 10-18 wt.% ceramic fiber, 33-45 wt.% colloidal silica, 30-42 wt.% total content of liquid carrier, 0.2-2.5 wt.% organic polymer and 1-15 wt.% barium sulfate. The composition has a high level of resistance to attack or penetration by molten aluminum.

DETAILED DESCRIPTION OF THE PREFERRED EMBODIMENTS

The refractory composition in accordance with the present invention can contain 10-18 wt.% ceramic fibers, 33-45 wt.% colloidal silica, 30-42 wt.% liquid carrier, 0.2-3.5 wt.% organic polymer and 1-15 wt.% barium sulfate. Preferably, the composition contains 14-18 wt.% ceramic fibers, 35-42 wt.% colloidal silica, 34-42 wt.% liquid carrier or vehicle, 0.5-2.5, typically up to 1.8 wt.% organic polymer and 2-10 wt.% barium sulfate, typically 2 to 6 wt.%. A typical composition is 16 wt.% ceramic fibers, 39 wt.% colloidal silica, 39 wt.% liquid carrier, 1 wt.% organic polymer and about 5 wt.% barium sulfate.

The ceramic fiber can be selected from alumina, aluminum silicate, mullite, calcium aluminum silicate, mineral wool or silicon carbide. The preferred type of ceramic fiber is aluminum silicate available from The Carborundum Company under the name Fiberfrax. Other aluminum silicates which can be used are obtained from Johns Manville under the name Cerafiber, or from A.P. Green Refractories under the name Inswool. Fiberfrax is a ceramic fiber made from alumina and silica. The ceramic fiber can contain about 51 wt.% alumina and about 47 wt.% silica and may be chopped, e.g., from about ½ to 1 inch long and about 2 microns in diameter and retains its properties to 1260° C. and under some conditions up to 1648° C.

The colloidal silica used in the invention may contain between 15 and 50% solids and have a mean particle size of about 5 to 60 millimicrons. Colloidal silica suitable for use in the invention is available from Nalco Chemical Company and is referred to as Nalcoag 1130, 1140, 1050 and 1060.

The liquid vehicle can be water or a combination of water and ethylene glycol with up to 50 wt.% ethylene glycol. It should be noted that water can be totally or partially supplied by the liquid fraction of the colloidal material, e.g. colloidal silica. Other alcohols that may be used include ethanol and diethylene glycol.

The organic polymer is employed as a thickening or adhesion enhancing agent and may be selected from liquid or powder anionic, cationic or non-ionic high molecular weight organic polymer materials. The polymers contain polar groups that impart adhesive-type properties. Examples of such are the amide groups, amine groups, ether groups, hydroxyl groups and carboxyl groups. Particularly useful are the acrylamide/acrylate-derived polymers, such as Nalco 2388 and 7879, available from Nalco Chemical Company. Other amide-derived polymers are the Reten type produced by Hercules, Inc. Other suitable polymers are the hydroxyl or carboxyl methylcellulose type, such as Methocel, available from Dow Chemical Company. Also suitable are the polyethylene oxide polymers, such as the Polyox type, available from Union Carbide Corporation.

The polymer, when added in small quantities, acts as a thickening agent and improves the adhesion qualities of the finished product, which aids in moldability. Other polymers are described in the aforementioned U.S. Pat. No. 4,174,331, incorporated herein by reference. Polymers which have been found useful in the present invention are Nalcoag 7879 and 2388 available from Nalco Chemical Company.

The barium sulfate useful in the invention can have a purity level of 95% or more, with the remainder clay. Such material is available as natural barytes. This material is available from Cyprus Mining Company and referred to as #22 Barytes, Barimite-XF and Barimite. If a higher purity form of barium sulfate is desired, it can be obtained from the Charles A. Wagner Company under the name AMBAR-C. The barium sulfate is normally provided or ground to a mean particle size of about 10 μm.

These ingredients are blended together to provide a refractory composition. For purposes of blending, it is preferred to dissolve the polymer in the liquid prior to adding the solid materials.

If colloidal alumina is used, the amount is in the range of 5 to 17 wt.%, and the liquid level, e.g., water or ethylene glycol, is in the range of 60 to 80 wt.%, preferably 68 to 78 wt.%. The ceramic fiber, organic polymer and barium sulfate are maintained at the same level as for the silica system.

The colloidal alumina may be about 10 to 20% solids with a mean particle size of about 2 to 50 millimicrons. An example of this material is Nalcoag 1SJ-614 manufactured by Nalco Chemical Company.

The following example is further illustrative of the invention.

A molding composition was prepared by pre-blending 23 grams of Nalcoag 2388 polymer with 1771 grams of Nalcoag 1050 colloidal silica in a Hobart mixer. To this mixture, 362 grams of Fiberfrax 7000 Fiber and 114 grams of #22 Barytes barium sulfate were added. The total mixture was mixed until a molding consistency was obtained.

The formulation of this example was evaluated for resistance to chemical attack. In the test, the formulation was molded into the shape of a receptacle, fired to 1500° F., cooled and re-fired to 1500° F. Molten 7075 aluminum alloy was poured into the receptacle and kept there for 72 hours at 1500° F. Thereafter, a portion of the molten alloy was withdrawn for chemical analysis. The chemical analysis of the portion was compared to the chemical analysis of the starting alloy for determination of contamination. The analysis shows the silicon content of the withdrawn alloy to be 0.8%, which is considered excellent resistance to molten aluminum for this classification of product. The receptacle from the subject invention exhibited no noticeable penetration while a commercially available refractory, formed into a receptacle and treated in the same way, was totally penetrated by alloy.

The results of the analysis are provided in the following Table.

TABLE

|  | Example 1 | Standard 7075 Alloy |
|---|---|---|
| Penetration into receptacle | None |  |
| Reaction with receptacle surface | Slight - some sticking of alloy to receptacle |  |
| Analytical chemical analysis of withdrawn alloy |  |  |
| Si | 0.80 | 0.10 |
| Fe | 0.20 | 0.20 |
| Cu | 1.70 | 1.60 |
| Cr | 0.22 | 0.22 |
| Mg | 2.50 | 2.50 |
| Zn | 5.75 | 5.75 |
| Ti | 0.03 | 0.03 |

Having thus described the invention, what is claimed is:

1. A ceramic fiber containing refractory moldable composition suitable for use with molten aluminum alloys, the composition comprised of:
   (a) 10-18 wt.% ceramic fiber;
   (b) 33-45 wt.% colloidal silica;
   (c) 30-42 wt.% total content of liquid carrier;
   (d) 0.2-3.5 wt.% organic polymer; and
   (e) 1-15 wt.% barium sulfate.

2. The composition in accordance with claim 1 wherein the ceramic fibers are in the range of 14 to 18 wt.%.

3. The composition in accordance with claim 1 wherein the colloidal silica is in the range of 35 to 42 wt.%.

4. The composition in accordance with claim 1 wherein the liquid carrier is in the range of 34 to 42 wt.%.

5. The composition in accordance with claim 1 wherein the barium sulfate is in the range of 2 to 10 wt.%.

6. The composition in accordance with claim 1 wherein the barium sulfate is in the range of 2 to 6 wt.%.

7. The composition in accordance with claim 1 wherein the ceramic fibers are selected from alumina, aluminum silicate, mullite, calcium aluminum silicate, mineral wool and silicon carbide and mixtures thereof.

8. The composition in accordance with claim 1 wherein the fiber is aluminum silicate.

9. The composition in accordance with claim 1 wherein the colloidal silica has a solids content in the range of 15-58 wt.% and a particle size in the range of about 5-60 millicrons.

10. The composition in accordance with claim 1 wherein the liquid carrier is selected from the group consisting of water, methanol, ethanol, ethylene glycol and diethylene glycol and mixtures thereof.

11. The composition in accordance with claim 1 wherein the carrier is water.

12. The composition in accordance with claim 1 wherein the polymer is a high molecular weight, anionic, liquid acrylamide/acrylate polymer.

13. A ceramic fiber containing refractory moldable composition resistant to penetration by molten aluminum alloys, the composition comprised of:
   (a) 14-18 wt % ceramic fiber;
   (b) 35-42 wt.% colloidal silica;
   (c) 34-42 wt.% total content of liquid carrier;
   (d) 0.5-2.5 wt.% organic polymer; and
   (e) 2-10 wt.% barium sulfate.

14. The composition in accordance with claim 13 wherein the ceramic fibers are selected from alumina, aluminum silicate, mullite, calcium aluminum silicate, mineral wool and silicon carbide and mixtures thereof.

15. The composition in accordance with claim 13 wherein the ceramic fibers are alumina fibers.

16. The composition in accordance with claim 13 wherein the ceramic fibers are aluminum silicate fibers.

17. The composition in accordance with claim 13 wherein the ceramic fibers are mullite fibers.

18. The composition in accordance with claim 13 wherein the ceramic fibers are mineral wool.

19. The composition in accordance with claim 13 wherein the ceramic fibers are silicon carbide.

20. The composition in accordance with claim 13 wherein the ceramic fibers are calcium aluminum silicate.

21. A ceramic fiber containing refractory moldable composition resistant to penetration by molten aluminum alloys, the composition comprised of:
(a) 14–18 wt.% aluminum silicate fibers;
(b) 35–42 wt.% colloidal silica;
(c) 34–42 wt.% water;
(d) 0.5–2.5 wt.% organic polymer; and
(e) 2–10 wt.% barium sulfate.

22. A ceramic fiber containing refractory moldable composition suitable for use with molten aluminum alloys, the composition comprised of:
(a) 10–18 wt.% ceramic fiber;
(b) 5–17 wt.% colloidal alumina;
(c) 60–80 wt.% total content of liquid carrier;
(d) 0.2–2.5 wt.% organic polymer; and
(e) 1–15 wt.% barium sulfate.

* * * * *

UNITED STATES PATENT AND TRADEMARK OFFICE
CERTIFICATE OF CORRECTION

PATENT NO. : 4,992,395

DATED : Feb. 12, 1991

INVENTOR(S) : Jed L. Dulberg, et al.

It is certified that error appears in the above-identified patent and that said Letters Patent is hereby corrected as shown below:

Column 4, line 35 (claim 9), change "15-58 wt.%" to --15-50 wt.%--.

Column 4, line 36 (claim 9), change "millicrons" to --millimicrons--.

Signed and Sealed this

Twenty-fifth Day of August, 1992

Attest:

DOUGLAS B. COMER

*Attesting Officer*       Acting Commissioner of Patents and Trademarks